Nov. 20, 1928.
J. A. REECE
1,692,702
METHOD AND APPARATUS FOR FORMING SHEET GLASS
Filed April 19, 1926  2 Sheets-Sheet 1
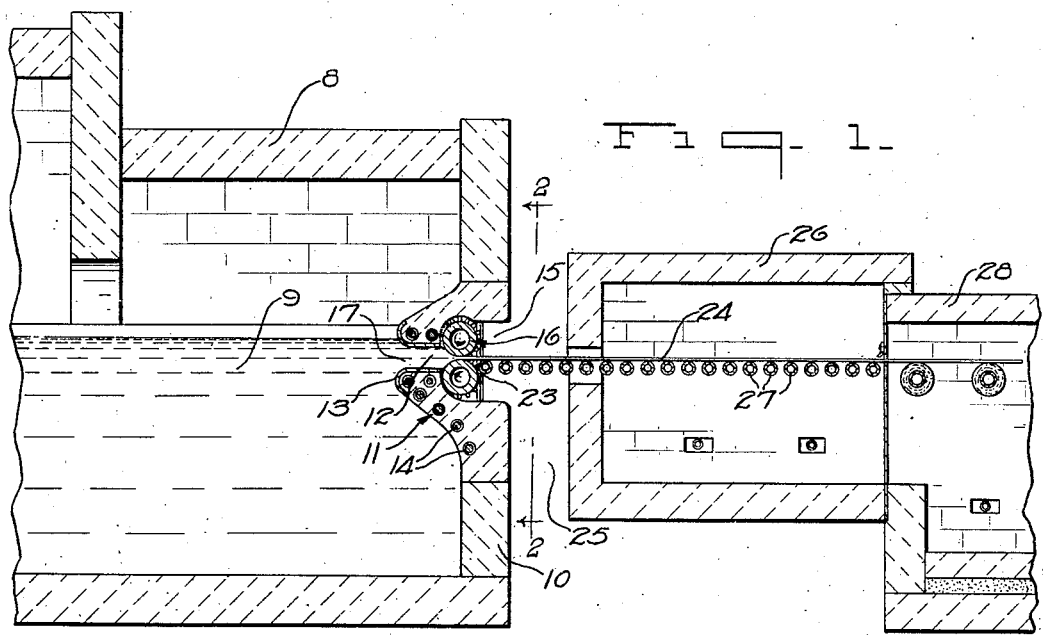
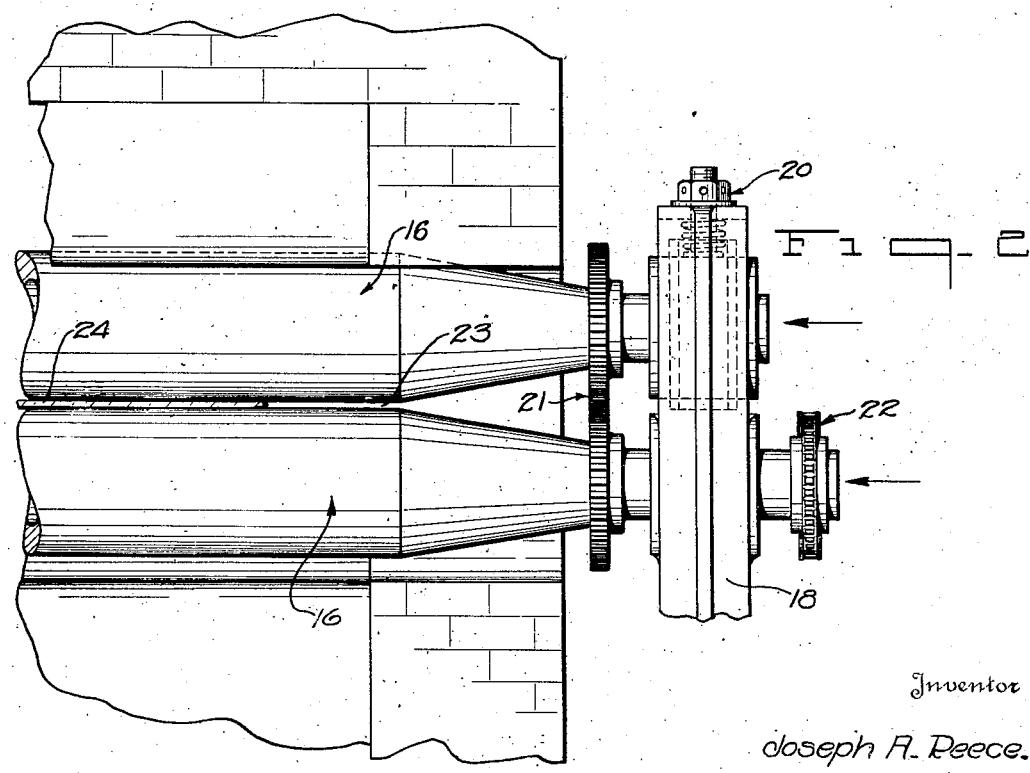
Inventor
Joseph A. Reece.
By Frank Fraser
Attorney

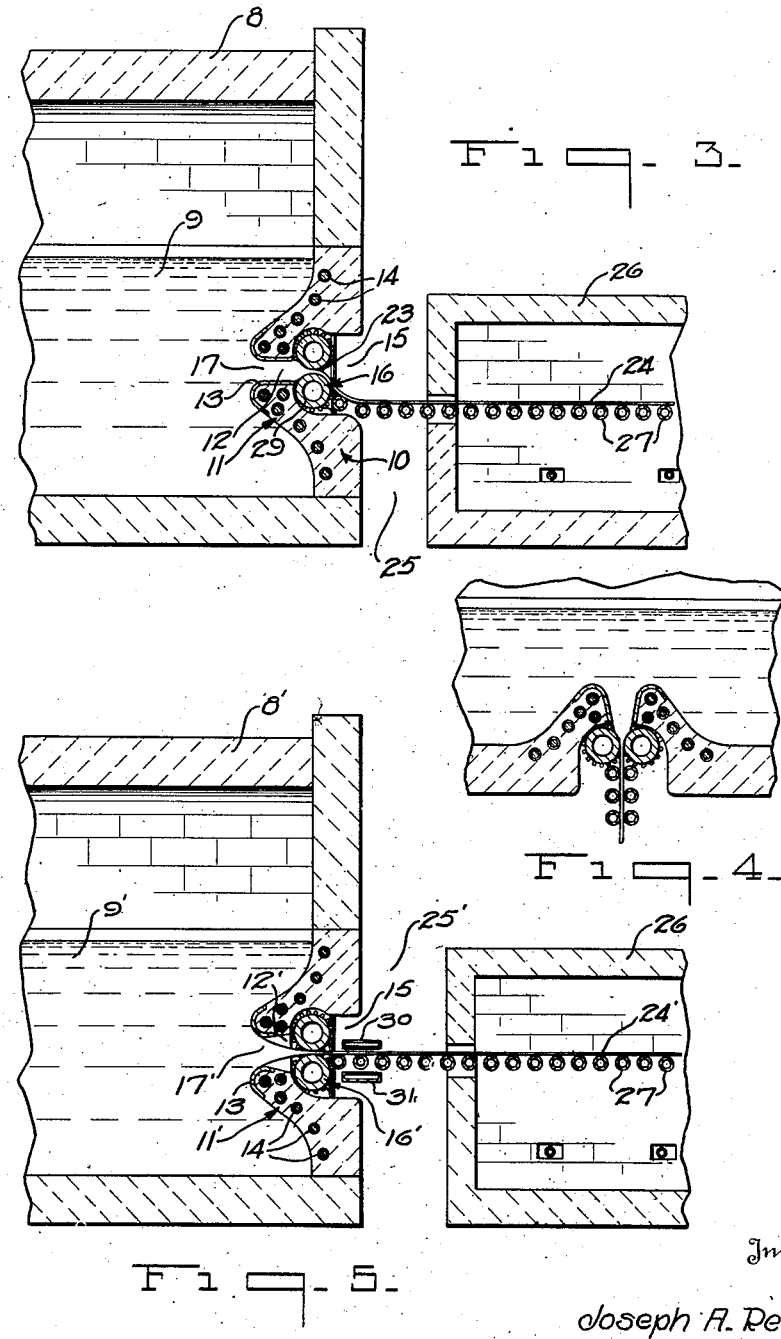

Patented Nov. 20, 1928.

1,692,702

UNITED STATES PATENT OFFICE.

JOSEPH A. REECE, OF TOLEDO, OHIO, ASSIGNOR TO THE LIBBEY-OWENS SHEET GLASS COMPANY, OF TOLEDO, OHIO, A CORPORATION OF OHIO.

METHOD AND APPARATUS FOR FORMING SHEET GLASS.

Application filed April 19, 1926. Serial No. 102,843.

The present invention relates to improvements in the art of forming a continuous ribbon of glass from a mass of molten glass contained in a receptacle.

An object of the invention is to provide a receptacle containing molten glass with means whereby a sub-surface strata of molten glass contained therein may discharge from the receptacle, and to further provide means for forming a continuous ribbon of glass from the molten glass discharging from the receptacle.

Another object of the invention is to provide means for continuously feeding under pressure a supply of remote sub-surface molten glass, contained in a receptacle, to a pair of rotatable rolls adapted to receive said molten glass under pressure, and form it into a continuous ribbon of glass.

A further object of the invention is to provide an inwardly extending wall, of a receptacle containing molten glass, with means whereby a continuous supply of molten glass may issue therefrom under the head pressure of the molten glass contained therein, and to further provide said wall with means whereby the issuing molten glass will be shielded from the coacting peripheries of a pair of sheet forming rolls, adapted to receive said molten glass, prior to the formation thereof into sheet form.

Other objects and advantages of the invention will become apparent during the course of the following description.

In the drawings wherein like numerals are employed to designate like parts throughout the same, Fig. 1 is a longitudinal section through the improved sheet glass forming apparatus, Fig. 2 is a partial transverse vertical section taken substantially on line 2—2 in Fig. 1, and Figs. 3, 4 and 5 are modified forms of the invention.

As it is the principal object of the present invention to provide a receptacle containing molten glass with means permitting only the remote sub-surface glass contained therein to be used for rolling out a continuous sheet or ribbon of glass, it may be well at this time to describe what is meant by "remote sub-surface glass". Remote sub-surface glass, in accordance with the present invention, pertains to the molten glass lying below the level of a mass of contained molten glass, and more particularly to that section of molten glass whose temperature is substantially uniform throughout, which is substantially free from all imperfections and impurities, and which is at such a distance from all exposed sides of the molten glass container to prevent its uniform temperature condition from becoming materially affected by the fluctuating temperatures normally prevailing at the side walls of a molten glass container. It is therefore obvious that remote sub-surface molten glass will be of a very high grade, and consequently the quality of the continuous sheet or ribbon of glass rolled therefrom should be much better than the ordinary rolled glass.

Referring to the drawings in detail, the numeral 8 refers to a tank furnace or receptacle containing a mass of molten glass 9. Associated with a wall 10 of the tank furnace is an inwardly and rearwardly extending member or projection 11, having an outlet 12 arranged therein a suitable distance below the level of the molten glass in the receptacle through which the remote sub-surface molten glass may pass, preferably under pressure. The outlet is preferably lined with a liner 13 of graphite clay, nichrome, Monel metal, or other similar non-corrosive material. In order to overcome the tendency of "dog metal" forming upon the projection 11 or in the outlet 12, electric resistors 14, or some other form of heating means, may be employed to control the temperature of the molten glass contacting therewith. The wall is also provided with an indentation 15 symmetrically arranged about the outlet 12. Disposed within the indentation and in close proximity to and in front of the outlet is a pair of vertically stacked rotatable members or rolls 16, adapted to receive between their coacting surfaces the molten glass 17 issuing through said outlet. The pair of rolls are supported in front of and transversely across the outlet 12 in bearings suitably mounted in a supporting bracket 18 arranged at both sides of the receptacle. The upper roll of the pair of rolls 16 is mounted in the bracket 18 in such a manner to permit it to be raised or lowered by a screw and nut arrangement 20 shown in Fig. 2, which thereby controls the vertical distance between the pair of rolls. The rolls are driven together and in opposite directions, preferably in a manner shown in Fig. 2 of the drawings, by the gears 21 and by connecting one of the rolls to some convenient form of drive 22. The temperature of said pair of rolls may be controlled by suitably circulating a cooling medium therethrough.

When the rolls are arranged in spaced relationship with each other, there is formed between them, in horizontal alignment with the outlet 12, a horizontal slot or opening 23 into which the molten glass 17 in the outlet 12 is forced under head pressure of the molten glass in the receptacle, and as the pair of rolls 16 rotate, there issues horizontally from the slot 23 a continuous ribbon of glass 24. The arrangement of the projection 11, the outlet 12, and the indentation 15, is particularly well adapted for reducing to a minimum the peripheral contact of the coacting pair of rolls 16 with the molten glass as it issues from the outlet 12, from which the glass sheet 24 is later formed. The ribbon is caused to attain a semi-rigid state while passing through the open space 25, from which it is conveyed to a chamber 26 where it is permitted to become permanently set upon a plurality of closely spaced positively driven rolls 27 before entering the annealing leer 28.

The modification illustrated in Fig. 3 shows the improved device positioned at a somewhat greater distance below the level of the molten glass in the receptacle 8 than is covered by the main embodiment of the invention. The continuous ribbon of glass 24, after being formed between the pair of rolls 16, is permitted to droop down over the lower roll 29, which functions to provide slack in the continuous ribbon of glass, as there may be some tendency upon the part of the positively driven rolls 27 to draw the ribbon taut from the pair of rolls 16, and thus create a tension therein.

The modification illustrated in Fig. 4 shows a manner in which the improved device may be applied to the bottom of a receptacle containing molten glass.

The modification illustrated in Fig. 5 shows a manner in which the remote sub-surface molten glass contained in a receptacle may be drawn therefrom by employing the use of the improved construction. In this case the molten glass 17' is "drawn" through the outlet 12' by the pair of forming rolls 16' faster than the head pressure of the molten glass behind it can force it therethrough, and thus form the continuous ribbon of glass 24'. It may require a greater cooling than that created by the open space 25' to cause the sheet to attain a semi-rigid state. If so, additional cooling may be created by heat absorbing members 30 and 31.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In an apparatus for producing a continuous ribbon of glass, means containing a mass of molten glass, and a sheet glass rolling means extending inwardly of one end thereof to a point partially beyond the adjacent end of the mass of molten glass.

2. In an apparatus for producing a continuous sheet of glass, a tank for containing a mass of molten glass, an end wall extending inwardly and rearwardly thereof, said wall having an orifice therein, and a sheet glass rolling means associated with the orifice.

3. In an apparatus for producing a continuous sheet of glass, a tank containing a mass of molten glass, an end wall of said tank having a slotted depression therein projecting rearwardly within the molten glass, and means associated therewith for continuously forming a sheet of glass from the molten glass permitted to issue from the slot in said depression.

4. In an apparatus for producing a continuous sheet of glass, a tank containing a mass of molten glass, a mouthpiece associated with the forward end of said tank and projecting rearwardly therewithin for permitting a discharge of molten glass therefrom, and a plurality of rotatable members arranged within said mouthpiece for reducing the discharging molten glass to sheet form.

5. In an apparatus for producing a continuous sheet of glass, means containing a mass of molten glass, an inwardly projecting means associated with said means, permitting a discharge of molten glass therefrom, and means for rolling the discharging molten glass to sheet form.

6. In an apparatus for producing a continuous sheet of glass, a tank containing a mass of molten glass, an inwardly extending mouthpiece associated with a wall of said tank, means within said mouthpiece permitting molten glass to discharge therefrom, and means arranged in close proximity to said means for rolling the discharging molten glass to sheet form.

7. In an apparatus for producing a continuous ribbon of glass, a tank containing a mass of molten glass, a wall thereof projecting within one end of the molten glass and extending rearwardly of the tank, said wall having an opening therein through which molten glass may flow under pressure, and means for heating said wall and outlet.

8. In an apparatus for producing a continuous ribbon of glass, means containing a mass of molten glass, a mouthpiece projecting within one end of the molten glass and extending rearwardly of the tank through which the molten glass may be fed horizontally, and means for controlling the temperature of said mouthpiece.

9. In an apparatus for producing a continuous ribbon of glass, means containing a mass of molten glass, a heated mouthpiece projecting within one end of the molten glass and extending rearwardly of the tank, adapted to permit molten glass to discharge therefrom, and means suitably arranged within said mouthpiece for controlling the flow of the molten glass therefrom.

10. In an apparatus for producing a continuous ribbon of glass, means containing a mass of molten glass, means projecting within one end of said molten glass and extending rearwardly of the tank through which molten glass may issue horizontally, a sheet glass rolling means associated therewith, and means for controlling the temperature of said projecting means.

11. In combination with a tank containing molten glass and a continuous sheet glass forming means, of means projecting rearwardly within said tank through which molten glass may issue, said means also adapted to shield said issuing molten glass from contacting with said sheet forming means prior to the sheet formation.

12. In combination with a tank containing molten glass, and a continuous sheet glass forming means, of a means projecting rearwardly within said tank having an opening therein, permitting a supply of molten glass under pressure to be fed continuously to said sheet forming means.

13. In combination with a tank containing molten glass and a continuous sheet glass rolling means, of means, below the level of and projecting rearwardly within the molten glass in the tank, adapted to feed said molten glass to said sheet glass rolling means.

14. In combination with a tank containing molten glass and a continuous sheet glass forming means, of a wall of said tank having a sluice for the molten glass, said sluice including a top portion and a bottom portion projecting rearwardly within the tank.

15. In combination with a tank containing molten glass and a continuous sheet glass rolling device, of a sluice below the level of and extending rearwardly within the molten glass in said tank, and means for controlling the temperature of the molten glass adjacent and within said sluice.

16. In apparatus for producing a continuous ribbon of glass, a tank containing a mass of molten glass, a portion of said tank having an indented outlet extending rearwardly within the tank and through which molten glass may continuously issue under pressure, and a pair of rotatable rolls adapted to continuously receive said molten glass under pressure, and to form therefrom a continuous ribbon of glass.

17. In apparatus for producing a continuous ribbon of glass, means containing a mass of molten glass, a portion of said means having an indentation extending rearwardly within the tank and adapted to permit molten glass to continuously issue therefrom, and a pair of rotatable cooled rolls arranged within said indentation adapted to control the flow of molten glass issuing therefrom, said rolls also adapted to form a continuous ribbon of glass from the molten glass permitted to issue from the indentation.

18. In apparatus for producing a continuous ribbon of glass, including a pair of cooled rolls, means for rotating the rolls, a tank containing molten glass having an inwardly and rearwardly projecting outlet in communication with the rolls, and means associated with said outlet to shield the rolls from contacting the molten glass until said molten glass has nearly reached the common vertical plane formed between their coacting peripheries.

19. In apparatus for producing a continuous ribbon of glass, including a pair of cooled rotatable rolls, a tank containing a mass of molten glass, means projecting rearwardly within said tank, having an outlet communicating with said rolls, said means also shielding the molten glass issuing from said outlet from contacting the peripheries of said rolls until it nearly reaches the common vertical plane through the centers of said rolls.

20. In apparatus for producing a continuous ribbon of glass, including a tank containing molten glass, having an inwardly and rearwardly projecting outlet through which molten glass may be continuously discharged under pressure, and a pair of cooled rotatable sheet glass forming members arranged in close proximity to said outlet.

21. In apparatus for producing a continuous ribbon of glass, including a tank containing molten glass, said tank having an inwardly and rearwardly projecting outlet therein through which molten glass may be continuously discharged under head pressure, a pair of cooled rotatable rolls forming a slot adapted to receive molten glass discharging from the outlet, and means associated with said outlet to limit the peripheral contact of said rolls with the molten glass as it passes from the outlet to said slot.

22. In apparatus for producing a continuous ribbon of glass, including a tank containing molten glass, said tank having an inwardly and rearwardly projecting outlet therein through which molten glass may continuously discharge under head pressure, a pair of cooled rotatable rolls arranged in close proximity to said outlet to form a continuous sheet of glass from the molten glass discharging therefrom, means associated with said outlet to limit the peripheral contact of said rolls with the molten glass supplied to them, and means for controlling the temperature of said means.

23. In apparatus for producing a continuous ribbon of glass, including a receptacle containing molten glass, having an inwardly and rearwardly projecting outlet through which molten glass may continuously issue under pressure, a suitable lagging covering the surface of the outlet, and a sheet glass forming means arranged in close proximity to said outlet.

24. In apparatus for producing a continuous ribbon of glass, including a receptacle containing molten glass, having an inwardly and rearwardly projecting outlet through which molten glass may continuously issue under pressure, means for forming a continuous ribbon of glass from said molten glass, means associated with said outlet for shielding the sheet forming means from the molten glass passing thereto from the receptacle, means for setting the ribbon of glass thus formed, and means for annealing said ribbon when formed.

25. In sheet glass apparatus, a tank containing a mass of molten glass and having an end wall, a member arranged within said wall and projecting rearwardly within the tank and having a slot therein beneath the level of said molten glass for receiving a stream of sub-surface glass therefrom, and means adjacent the outer end of said slot for receiving the stream of glass and rolling it to sheet form.

26. In sheet glass apparatus, a tank containing a mass of molten glass and having an end wall, a member arranged within said wall and projecting rearwardly within the tank and having a slot therein beneath the level of said molten glass for receiving a stream of sub-surface glass therefrom, means adjacent the outer end of said slot for receiving the stream of molten glass and rolling it to sheet form, and means embedded within said member for heating the stream of molten glass as it flows through said slot.

27. In sheet glass apparatus, a tank containing a mass of molten glass and having an end wall, a member arranged within said wall and having a top portion and a bottom portion projecting rearwardly within the tank and forming a slot beneath the level of said molten glass for receiving a stream of subsurface glass therefrom, means adjacent the outer end of said slot for receiving the stream of molten glass and rolling it to sheet form, and a non-corrosive lining for the top and bottom portions of said member.

28. In sheet glass apparatus, a tank containing a mass of molten glass and having an end wall, a member arranged within said wall and having a top portion and a bottom portion projecting rearwardly within the tank forming a slot beneath the level of said molten glass for receiving a stream of sub-surface glass therefrom, the outer face of said member being formed within an indentation, and rolls arranged within said indentation at opposite sides of said slot for receiving the stream of molten glass and rolling it to sheet form.

29. The method of forming sheet glass, which consists in containing a mass of molten glass, causing a stream of sub-surface glass to flow, under pressure, from one end of said contained mass, heating the stream of molten glass from above and beneath as it flows from the contained mass, and then rolling this stream into sheet form and feeding it horizontally.

Signed at Toledo, in the county of Lucas and State of Ohio, this 16th day of April, 1926.

JOSEPH A. REECE.